United States Patent
Choe et al.

(10) Patent No.: US 9,140,912 B2
(45) Date of Patent: Sep. 22, 2015

(54) HOLOGRAPHY 3D DISPLAY

(71) Applicant: LG Display Co., Ltd., Seoul (KR)

(72) Inventors: Wooyoung Choe, Paju-si (KR); Juseong Park, Goyang-si (KR); Dongjun Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 133 days.

(21) Appl. No.: 14/140,894

(22) Filed: Dec. 26, 2013

(65) Prior Publication Data
US 2014/0300839 A1 Oct. 9, 2014

(30) Foreign Application Priority Data

Apr. 8, 2013 (KR) .......... 10-2013-0038206

(51) Int. Cl.
| | |
|---|---|
| *G02F 1/1335* | (2006.01) |
| *G02F 1/13* | (2006.01) |
| *G03H 1/22* | (2006.01) |
| *G02B 27/01* | (2006.01) |

(52) U.S. Cl.
CPC ............ *G02F 1/1313* (2013.01); *G03H 1/2205* (2013.01); *G03H 1/2294* (2013.01); *G02B 2027/0174* (2013.01); *G03H 2001/2236* (2013.01); *G03H 2001/2242* (2013.01); *G03H 2210/30* (2013.01); *G03H 2226/05* (2013.01)

(58) Field of Classification Search
CPC ............................................... G02B 2027/0174
USPC ............................................................ 349/15
See application file for complete search history.

(56) References Cited

U.S. PATENT DOCUMENTS

2002/0180659 A1* 12/2002 Takahashi .................. 345/4

FOREIGN PATENT DOCUMENTS

| KR | 10-2003-0087310 A | 11/2003 |
|---|---|---|
| KR | 10-2013-0106776 A | 9/2013 |

OTHER PUBLICATIONS

UK Office Action, UK Application No. GB1322190.8, Jun. 24, 2014, 6 pages.

* cited by examiner

*Primary Examiner* — Wen-Ying P Chen
(74) *Attorney, Agent, or Firm* — Fenwick & West LLP

(57) ABSTRACT

The present disclosure relates to a holography three dimensional display in which no 3D cross-talk problem is arisen. The present disclosure suggests an apparatus for displaying hologram images comprising: a display panel displaying a hologram image; a back light unit disposed at one side of the display panel for supplying a back light; a first light path deflecting cell disposed at another side of the display panel facing away from the back light unit for forming a first prism pattern along a first direction rotating by a predetermined angle from a horizontal axis of the display panel; and a second light path deflecting cell disposed in front of the first light path deflecting cell for forming a second prism pattern along a second direction perpendicular to the first direction.

11 Claims, 11 Drawing Sheets

No-cross talk

Cross talk

No-cross talk

No-cross talk

HOLOGRAPHY 3D DISPLAY

CROSS-REFERENCE TO RELATED APPLICATION

This application claims priority under 35 U.S.C. §119(a) from Republic of Korea Patent Application No. 10-2013-0038206 filed on Apr. 8, 2013, which is incorporated by reference herein in its entirety.

BACKGROUND

1. Field of the Invention

The present disclosure relates to a holography three dimensional display in which no 3D cross-talk problem is arisen. Especially, the present disclosure relates to an autostereoscopy type display without any 3D cross-talk problem in which the left eye holography image is presented to the left eye and the right eye holography image is presented to the right eye, separately.

2. Discussion of the Related Art

Recently, many technologies and researches for making and reproducing the 3D (Three Dimensional) image/video are actively developed. As the media relating to the 3D image/video are new concept for media providing virtual reality, the media relating to the 3D image/video can improve the visual information, and will lead the next generation display devices. The conventional 2D image system merely provides the image and video data projected to a planar view, but the 3D image system can provide the full real image data to the viewer. So, the 3D image/video technologies are the future directions of image/video technologies.

Typically there are some methods for reproducing 3D image/video; for example, the stereoscopy method, the autostereoscopic method, the volumetric method, the holography method and the integral imaging method. Among them, the holography method, in which the observer can see the holography image using LASER without special glasses, is the best method for enjoying the real 3D display quality. As the holography method has superior 3D depth and the observer can see the display object in 3D mode even with one eye, it is supposed to be the most ideal method for displaying 3D images without any demerit.

To produce a recording of the phase of the light wave at each point in an image, holography method, one of volumetric display types, uses a reference beam which is combined with the light from the scene or object (the object beam). If these two beams are coherent, optical interference between the reference beam and the object beam, due to the superposition of the light waves, produces a series of intensity fringes that can be recorded on standard photographic film. These fringes form a type of diffraction grating on the film, which is called the hologram. The central goal of holography is that when the recorded grating is later illuminated by a substitute reference beam, the original object beam is reconstructed (or reproduced), producing a 3D image/video.

There was a new development of the computer generated holography (or CGH) that is the method of digitally generating holographic interference patterns. A holographic image can be generated e.g. by digitally computing a holographic interference pattern and printing it onto a mask or film for subsequent illumination by suitable coherent light source. The holographic image can be displayed by a holographic 3D display, bypassing the need of having to fabricate a "hard-copy" of the holographic interference pattern each time.

Computer generated holograms have the advantage that the objects to be displayed do not have to possess any physical form at all. If holographic data of existing objects is generated optically, but digitally recorded and processed, and displayed subsequently, this method is termed CGH as well. For example, a holographic interference pattern is generated by a computer system and it is sent to a spatial light modulator such as Liquid Crystal Spatial Light Modulator (LCSLM or SLM), then the 3D image/video corresponding to the holographic interference pattern is reconstructed/reproduced by radiating a reference beam to the spatial light modulator. FIG. 1 is the structural drawing illustrating the digital holography image/video display device using the computer generated holography according to the related art.

Referring to FIG. 1, the computer 1 generates a holographic interference pattern of an image/video data to be displayed. The generated holographic interference pattern is sent to a SLM 2. The SLM 2, as a transmittive liquid crystal display (LCD) device, can represent the holographic interference pattern. At one side of the SLM 2, a laser source 3 for generating a reference beam is located. In order to radiate the reference beam 9 from the laser source 3 onto the whole surface of the SLM 20, an expander 4 and a lens system 5 can be disposed, sequentially. The reference beam 9 out from the laser source 3 is radiated to one side of the SLM 2 passing through the expander 4 and the lens system 5. For the case that the SLM 2 is a transmittive type liquid crystal display, a 3D image/video corresponding to the holography interference pattern will be reconstructed/reproduced at the other side of the SLM 2.

The conventional holography type 3D display includes bulky elements occupying large space such as laser source 3 generating the reference light 9, the expander 4 and the lens 5. With these bulky elements, the conventional holography type 3D display has large volume and heavy weight, so that it is not proper for a light, thin, and portable type display. Therefore, it is required to develop an autostereoscopy type thin panel holography 3D display.

In the case that the hologram is reproduced based on the LCD device, the pixel pitch of the LCD is too large, so that the proper viewing angle of the hologram is very limited. Therefore, the observer can see the hologram 3D images just within the very small viewing angle.

SUMMARY OF THE INVENTION

In order to overcome the above mentioned drawbacks, the purpose of the present disclosure is to suggest an apparatus for displaying 3D hologram images in which the observer can enjoy the hologram images at any position even though the hologram display apparatus has very narrow viewing angle. Another purpose of the present disclosure is to suggest an apparatus for displaying hologram images in which the left eye 3D hologram image is supplied to the left eye and the right eye 3D hologram image is supplied to the right eye, respectively. Still another purpose of the present disclosure is to suggest an apparatus for displaying hologram images in which any 3D cross-talk problem like that the left eye 3D hologram image is supplied to the right eye or vice versa is not caused.

In order to accomplish the above purposes, one embodiment of the present disclosure suggests an apparatus for displaying a hologram image comprising: a display panel displaying the hologram image; a back light unit disposed at one side of the display panel for supplying a back light; a first light path deflecting cell disposed at another side of the display panel facing away from the back light unit for forming a first prism pattern along a first direction rotated by a predetermined angle from a horizontal axis of the display panel; and a second light path deflecting cell disposed at one side of the first light path deflecting cell facing away from the display panel for forming a second prism pattern along a second direction perpendicular to the first direction.

In one embodiment, the first light path deflecting cell refracts light from the display panel on a first axis perpendicular to the first direction, and the second light path deflecting cell refracts the refracted light from the first light path deflecting cell on a second axis perpendicular to the second direction.

In one embodiment, the predetermined angle from the horizontal axis is within a range of 10 degrees to 80 degrees.

In one embodiment, the predetermined angle is 45 degrees.

In one embodiment, the first direction is rotated in any one of a clockwise direction and a counter-clockwise direction with the predetermined angle from the horizontal axis.

In one embodiment, the apparatus further comprises a phase retarding plate disposed between the first light path deflecting cell and the second light path deflecting cell.

In one embodiment, the phase retarding plate retards the phase of light from the first light path deflecting cell by 90 degrees.

In one embodiment, wherein the first light path deflecting cell includes a plurality of liquid crystal cells arrayed in a matrix manner along the horizontal axis and a vertical axis perpendicular to the horizontal axis, and the plurality of the liquid crystal cells form the first prism pattern by having a first same electric voltage on the liquid crystal cells along the first direction.

In one embodiment, the second light path deflecting cell includes another plurality of liquid crystal cells arrayed in the matrix manner along the horizontal axis and the vertical axis perpendicular to the horizontal axis, and said another plurality of the liquid crystal cells form the second prism pattern by having a second same electric voltage on said another plurality of the liquid crystal cells along the second direction.

In one embodiment, the first light path deflecting cell includes a plurality of liquid crystal cells arrayed in a matrix manner along the first direction and the second direction, and the plurality of the liquid crystal cells form the first prism pattern by having a first same electric voltage on the plurality of liquid crystal cells along the first direction.

In one embodiment, the second light path deflecting cell include another plurality of liquid crystal cells arrayed in the matrix manner along the first direction and the second direction, and said another plurality of the liquid crystal cells form the second prism pattern by having a second same electric voltage on said another plurality of crystal cells along the second direction.

The apparatus for displaying holography 3D images according to the present disclosure can obviate the problem such that the left eye holography 3D image is presented to the left and the right eyes simultaneously or the right eye holography 3D image is presented to the left and the right eyes simultaneously, regardless of the distance of the observer. Therefore, the apparatus for displaying holography 3D images according to the present disclosure has no 3D cross-talk problem in which the left eye holography 3D image is presented to the right eye or the right eye holography 3D image is supplied to the left eye.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Figure 1:
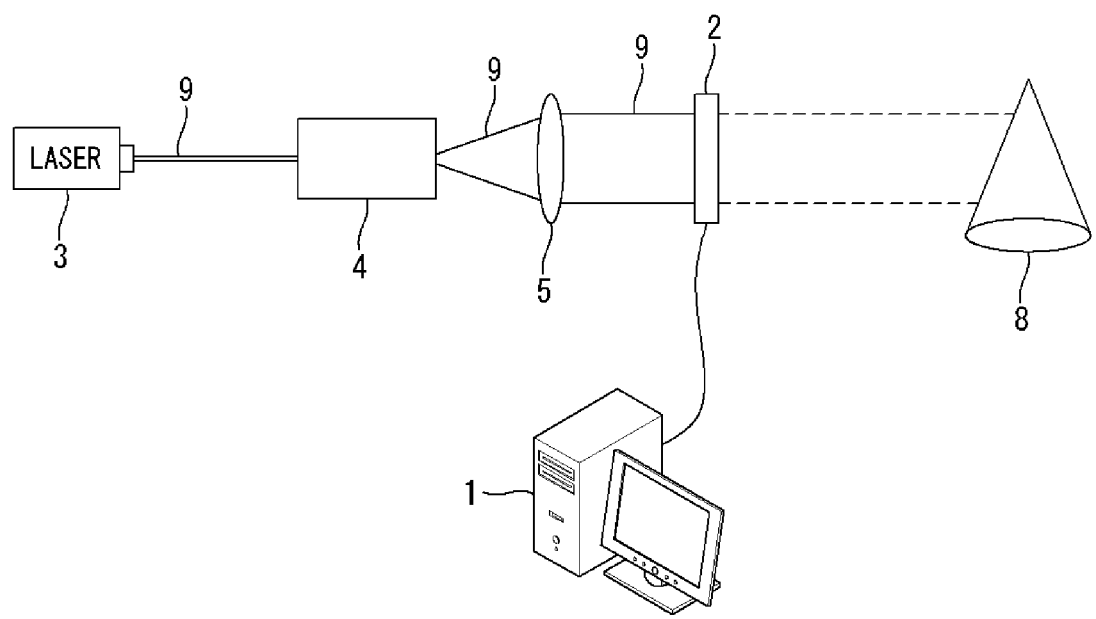
FIG. 1 is the structural drawing illustrating the digital holography image/video display device according to the related art.

Referring to attached figures, preferred embodiments of the present disclosure will be described. Like reference numerals designate like elements throughout the detailed description. However, the present disclosure is not restricted by these embodiments but can be applied to various changes or modifications without changing the technical spirit. In the following embodiments, the names of the elements are selected for ease of explanation and may be different from actual names.

Figure 2:
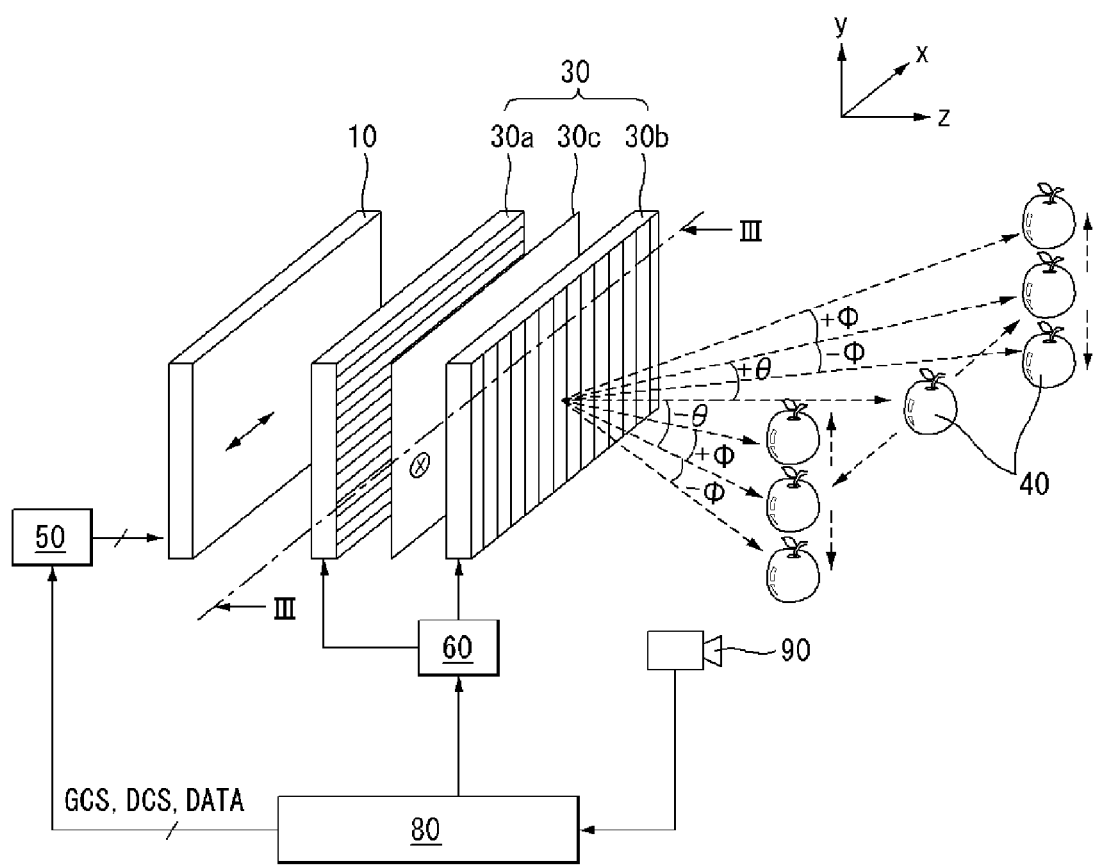
FIG. 2 is a perspective view illustrating a structure of a holography 3D display according to a first embodiment of the present disclosure.

Hereinafter, we will explain about a holography 3D display according to the first embodiment of the present disclosure. FIG. 2 is a perspective view illustrating a structure of a holography 3D display according to a first embodiment of the present disclosure. Referring to FIG. 2, a hologram 3D display according to the first embodiment of the present disclosure comprises a hologram display panel 10, a light deflecting cell 30 (or 'deflector') including a first and a second light path deflecting cells 30a and 30b and a phase retarding plate 30c located between them, a display panel driver 50, a deflector driver 60, a controller 80, and a detecting camera 90.

In the first embodiment, the hologram display panel 10 may have the similar structure as shown in FIG. 1. For example, the hologram display panel 10 may be made of the transmittive liquid crystal display panel. The hologram display panel 10 may display the interference fringe patterns by receiving the data relating to the interference fringe patterns from a computer or video processor (not shown in figures). Then, as the collimated light from the laser source disposed at one side of the hologram display panel 10 is radiated to the hologram display panel 10, the hologram images 40 may be displayed at the other side from the hologram display panel 10.

On the path of the collimated light is going (+Z axis of FIG. 2), the first light path deflecting cell 30a may be disposed next to the hologram display panel 10. The first light path deflecting cell 30a can transmit the light from the hologram display panel 10 as is. Or, it can refract the light to the upside (+φ) or to the downside (−φ) (on the Y axis of FIG. 2). Therefore, the hologram images 40 reproduced at distance apart from the hologram display panel 10 may be displayed at the upside/downside shifted position on the vertical axis (on the Y axis) by the first light path deflecting cell 30a.

Next to the first light path deflecting cell 30a, the second light path deflecting cell 30b may be further disposed. The second light path deflecting cell 30b can transmit the light from the first light path deflecting cell 30a as is. Or, it can refract the light to the left side (−θ) or to the right side (+θ) (on the X axis of FIG. 2). Therefore, the hologram images 40 may be displayed at the left side/right side shifted position on the horizontal axis (on the X axis) by the second light path deflecting cell 30b.

The hologram display panel driver 50 includes a gate driver and a data driver. The data driver receives the hologram data DATA from the controller 80 and then converts the hologram data DATA to the positive/negative analogue data voltages using the positive/negative gamma compensation voltage supplied from the gamma voltage generator (not shown). The data driver supplies the positive/negative analogue data voltages to the data lines of the hologram display panel 10. The gate driver supplies the gate pulse (or 'scan pulse') synchronized with the data voltage to the gate lines of the hologram display panel 10 sequentially, by the controlling signal from the controller 80.

The deflector driver 60 supplies the driving voltages for controlling the deflector 30 to the first light path deflecting cell 30a and the second light path deflecting cell 30b, respectively. The driving voltages can decide the inclined amount of the prism pattern formed at the deflector 30 so that the hologram images 40 can be radiated to a proper position of the user/observer. The driving voltages may be groups of voltages which are linearly increased or decreased for linearly controlling the alignment of the liquid crystal molecules disposed in the liquid crystal cell.

The deflector driver 60 may include a look-up table restoring a first driving voltage for passing the light supplied to the first light deflecting cell 30a as is, a second driving voltage for refracting the light to upside, a third driving voltage for refracting the light to downside, a fourth driving voltage for passing the light supplied to the second light deflecting cell 30b as is, a fifth driving voltage for refracting the light to left side, and a sixth driving voltage for refracting the light to right side. In this case, responding to the control signal from the controller 80, the deflector driver 60 selectively outputs voltages among the first to the sixth voltages according to the look-up table. Here, the look-up table can restore a plurality of driving voltages which decides the inclined angles of the prism patterns corresponding to the various positions of the observer.

The controller 80 may control the hologram display panel driver 50 for driving the hologram display panel 10. The controller 80 supplies the gate control signal GCS to the gate driver and it supplies the data control signal DCS and the hologram data DATA to the data driver. The gate control signal GCS may include a gate start pulse, a gate shift clock, a gate output enable and so on. The data control signal DCS may include a source start pulse, a source sampling clock, a source output enable, a polarity signal and so on.

The detecting camera 90 takes the pictures of the observer and sends them to the controller 80. The controller 80 analyzes the images of the pictures and calculates the position of the observer. The controller 80 compares the detected position of the observer with the reference position to decide the relative position of the observer from the reference position to the left side/right side and the upside/downside. According to this relative position of the observer, the controller 80 controls the deflector driver 60 and supplies the driving voltages for forming the prism pattern having proper inclined angle, to the first light path deflecting cell 30a and the second light path deflecting cell 30b, respectively.

Hereinafter, we will explain the light path deflecting cell 30. The first light path deflecting cell 30a forms the prism patterns which are parallel to the horizontal direction (the X axis of FIG. 2), so that the first electrodes 33 (in FIG. 3) may be disposed along the X axis of FIG. 2, that is same as the horizontal prism pattern array direction. On the contrary, the second light path deflecting cell 30b forms the prism patterns which are parallel to the vertical direction (the Y axis of FIG. 2), so that the first electrodes 33 may be disposed along the Y axis of FIG. 2, that is same as the vertical prism pattern array direction.

Figure 3:
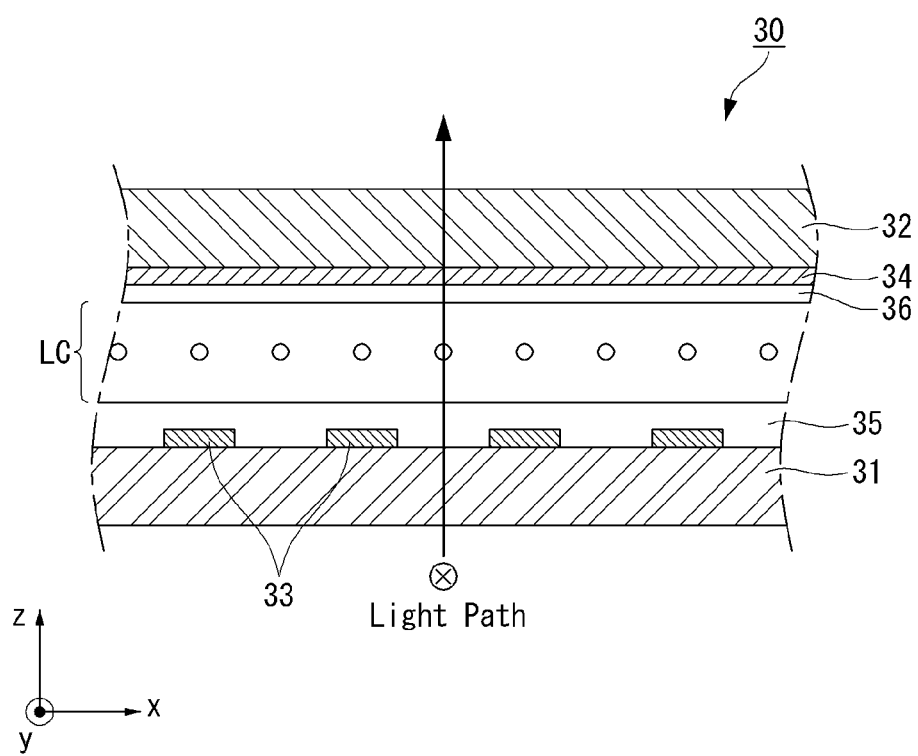
FIG. 3 is a cross sectional view cutting along the line III-III for illustrating a structure of a light path deflecting cell according to the first embodiment of the present disclosure.

Referring to FIG. 3, we will explain one exemplary configuration of the first light path deflecting cell 30a and the second light path deflection cell 30b, in more detail. The cross sectional view of the first light path deflecting cell 30a is actually very similar to that of the second light path deflection cell 30b. Here, we explain about the first light path deflecting cell 30a only, referring to FIG. 3 illustrating the cross sectional view cutting along the line III-III in FIG. 2.

Referring to FIG. 3, the first light path deflecting cell 30a or the second light path deflecting cell 30b has the structure in which a first substrate 31 and the second substrate 32 are facing and joined each other with a liquid crystal cell LC therebetween.

The first substrate 31 may be made of a plastic or glass substrate. On the first substrate 31, a first electrode 33 is formed. The first electrode 33 may be formed on the first substrate 31 with a transparent conductive material such as ITO (Indium Tin Oxide) or IZO (Indium Zinc Oxide). A plurality of the first electrodes 33 may be formed in one direction. Each of them is separated with a predetermined distance from each other in parallel forming a grating pattern. In FIG. 3, the first electrodes 33 are in a direction perpendicular to the plane on which FIG. 3 is (on the Y axis) in parallel, so that they are parallel to the linearly polarized direction of the light from the display panel 10. The first electrode 33 may be covered by a first transparent passivation layer 35. The first transparent passivation layer 35 may include an inorganic material such as silicon oxide (SiOx) or silicon nitride (SiNx).

The second substrate 32, like the first substrate 31 may be made of a plastic or glass substrate. The second substrate 32 may be disposed at the side where the light is passing through. On the second substrate 32, a second electrode 34 is formed. Unlike the first electrode 33, the second electrode 34 may be formed as a sheet electrode covering the whole surface of the second substrate 32. The second electrode 34 may be made of a transparent conductive material such as ITO or IZO. The second electrode 34 may be also covered by a second transparent passivation layer 36. The second transparent passivation layer 36 may include an inorganic material such as silicon oxide (SiOx) or silicon nitride (SiNx).

The liquid crystal cell LC positioned between the first substrate 31 and the second substrate 32 may be arrayed and driven in an Electrically Controlled Birefringence (ECB) mode. In the ECB mode, the liquid crystal molecules disposed nearest to the first and the second substrates 31 and 32 may be initially arrayed along the rubbing direction of the alignment layer (not shown in figures) formed on the inner side of the first and the second substrates 31 and 32. Other liquid crystal molecules between the outer most molecules are initially aligned as the long axis of the liquid crystal molecules are parallel to the first electrode 33 (to the Y axis). Therefore, in the ECB mode, before any driving voltage is supplied, most of all liquid crystal molecules are aligned as their long axis are parallel to the first electrode 33. After the driving voltages are supplied, the liquid crystal molecules may be rotated, so that their long axis may be realigned according to the electric field formed between the first electrode 33 and the second electrode 34. For example, in the ECB mode, the liquid crystal molecules may be changed their alignment direction between the horizontal direction and the vertical direction; that is, they can be rotating in 90 degrees.

In the above explanation referring to FIG. 3, the first light path deflecting cell 30*a* or the second light path deflecting cell 30*b* is configured with a liquid crystal panel having a plurality of electrodes of the grating patterns. However, the structure of the electrodes is not restricted to the grating pattern. For another example, the light path deflecting cell may be configured of a liquid crystal panel in which a plurality of pixel electrodes is disposed in a matrix manner. Hereinafter, we will explain about the driving method for forming the prism pattern with a liquid crystal panel. Here, we will explain with the case as shown in FIG. 3, it is possible to form the prism pattern with the liquid crystal panel having a plurality of pixel electrodes disposed in a matrix manner.

Figure 4:
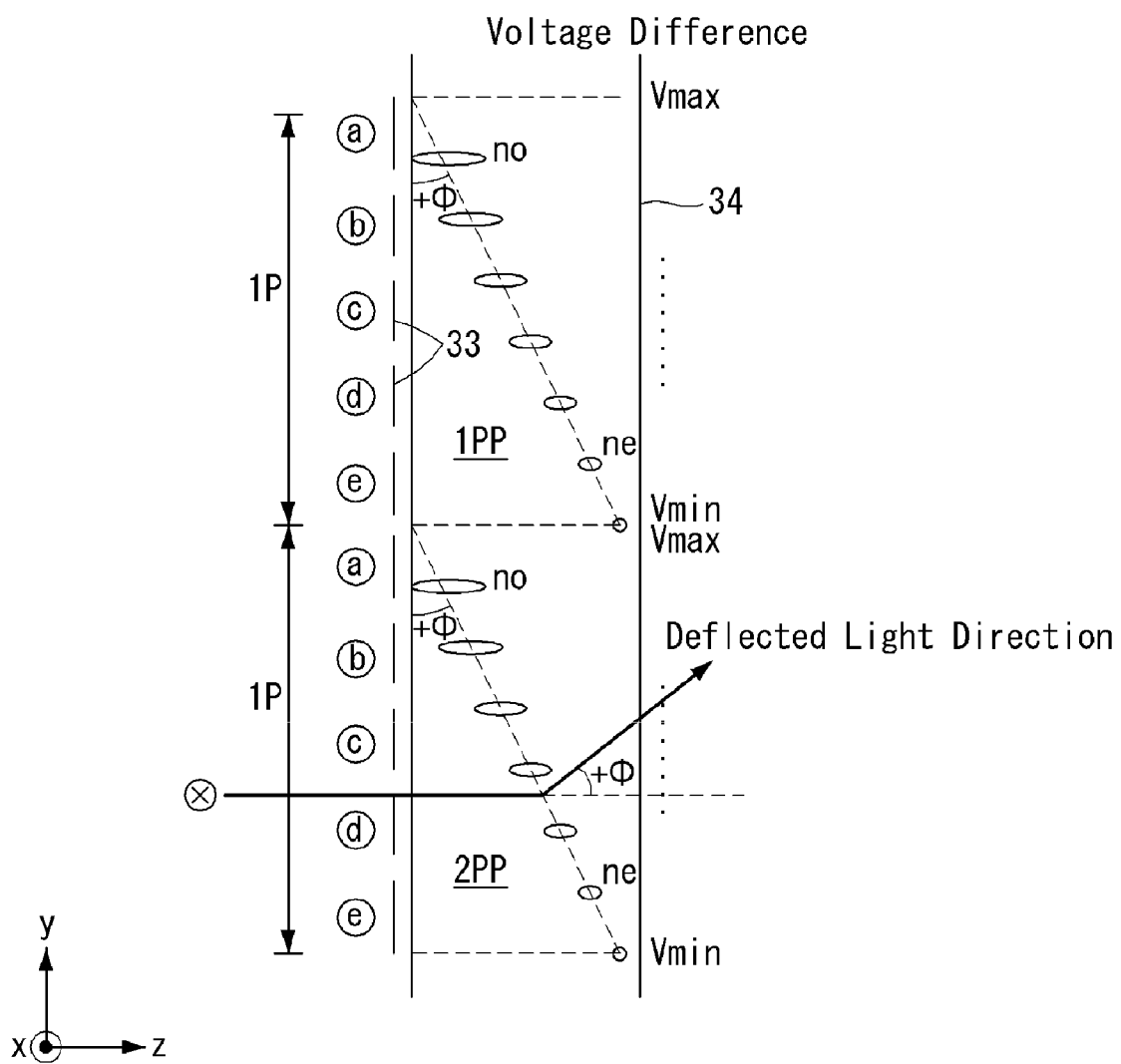
FIG. 4 is a cross sectional view illustrating a prism pattern of a first light path deflecting cell refracting the light to +φ direction (upside direction).
Figure 5:
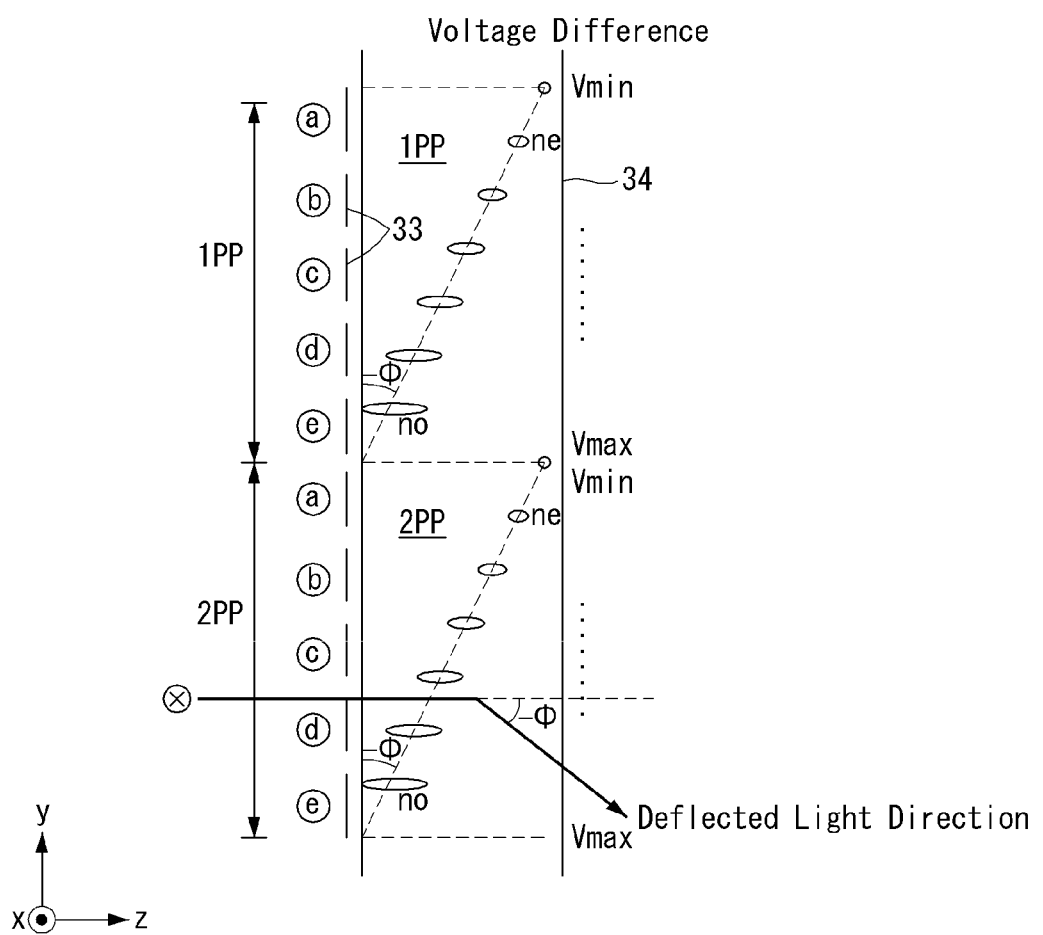
FIG. 5 is a cross sectional view illustrating a prism pattern of a first light path deflecting cell refracting the light to −φ direction (downside direction).

FIGS. 4 and 5 are figures for explaining an example of the prism pattern formed in the first light path deflecting cell 30*a*. FIG. 4 is a cross sectional view illustrating a prism pattern of a first light path deflecting cell refracting the light to +ϕ direction (upside direction). FIG. 5 is a cross sectional view illustrating a prism pattern of a first light path deflecting cell refracting the light to −ϕ direction (downside direction).

As shown in figures, in the ECB mode, the prism pattern 1PP and 2PP can be represented by controlling the alignment direction of the liquid crystal molecules. In the ECB mode, the liquid crystal molecules can have any direction angle between the horizontal state (parallel to the X axis of the FIGS. 4 and 5) to the first electrode 33 and the vertical state (parallel to the Z axis of the FIGS. 4 and 5) to the first electrode 33.

In the ECB mode, when the liquid crystal molecules are aligned in the vertical direction to the first electrode 33 (parallel to the Z axis of FIGS. 4 and 5), the refraction ratio, no, is the minimum value. When the liquid crystal molecules are aligned in the horizontal direction to the first electrode 33 (parallel to the X axis of FIGS. 4 and 5), the refraction ratio, ne, is the maximum value. As the light from the hologram display panel 10 is horizontally polarized (parallel to the X axis), the refraction ratio of this polarized light may be changed according to the alignment direction of the liquid crystal molecules of the first light path deflecting cell 30*a*. When the horizontally polarized light is passing through the vertically aligned (parallel to the Z axis) liquid crystal molecules, the refraction ratio may be the minimum value, no. When the horizontally polarized light is passing through the horizontally aligned (parallel to the X axis) liquid crystal molecules, the refraction ratio may be the maximum value, ne.

By controlling the aligned directions of the liquid crystal molecules included in one pitch 1P of the prism pattern 1PP and 2PP as to be progressively changed from vertical state (parallel to the Z axis) to the horizontal state (parallel to the X axis) along the +Y axis (from upside to downside), it is possible to make a prism pattern having the inclined angle of +ϕ, as shown in FIG. 4. By controlling the aligned direction of the liquid crystal molecules along to the −X axis (from downside to upside), it is possible to make a prism pattern having the inclined angle of −ϕ, as shown in FIG. 5.

At first, in the case the prism pattern has the inclined angle of +ϕ, as shown in FIG. 4, the first electrodes 33 are supplied with the second driving voltage including the gradually decreased voltages along the −Y axis. To the second electrode 34, a ground or reference voltage may be supplied. For example in FIG. 4, five of the first electrodes 33 are disposed within the one pitch 1P of the first prism pattern 1PP; along the −Y axis, (a) electrode, (b) electrode, (c) electrode, (d) electrode and (e) electrode are disposed. The V1 voltage is supplied to the (a) electrode, the V2 voltage is supplied to the (b) electrode, the V3 voltage is supplied to the (c) electrode, the V4 voltage is supplied to the (d) electrode and the V5 voltage is supplied to the (e) electrode. Here, these five voltages should be gradually decreased that is, the relations between them would be V1>V2>V3>V4>V5.

Further, in the case the prism pattern has the inclined angle of −ϕ, as shown in FIG. 5, the first electrodes 33 are supplied with the third driving voltage including the gradually increased voltages along the −Y axis. To the second electrode 34, a ground or reference voltage may be supplied. For example in FIG. 5, five of the first electrodes 33 are disposed within the one pitch 1P of the first prism pattern 1PP; along the −Y axis, as mentioned above. Here, these five voltages configuring the third driving voltage should be gradually increased, that is, the relations between them would be V1<V2<V3<V4<V5.

In the ECB mode, when no electric field is supplied to the liquid crystal cell, all liquid crystal molecules are aligned in the direction parallel to the first electrode 33 running direction, that is, the initial alignment direction (or, the horizontal direction). As all liquid crystal molecules in the liquid crystal cell LC are aligned in the horizontal direction, the refraction ratios of the liquid crystal cells have the same value, ne. Therefore, the vertically polarized light from the hologram display panel 10 would transmit the first light path deflecting cell 30*a* without any refraction.

On the other hand, as the first electrode 33, at which the driving voltages are supplied in the first light path deflecting cell 30*a*, is aligned in the horizontal direction, the liquid crystal cell of the ECB mode would be rotated to 90 degrees from the horizontal direction, that is the initially aligned direction. Therefore, in order to form the prism pattern, the horizontally (parallel to the X axis) polarized light is required.

In the interim, in the second light path deflecting cell 30*b*, the first electrode 33 is running along vertical direction. Therefore, the liquid crystal molecules configuring the liquid crystal cell in the second light path deflecting cell 30*b* may be rotated by 90 degree from the initially vertical direction (parallel to the X axis) parallel to the first electrode 33. When the horizontally polarized light is supplied to the second light path deflecting cell 30*b*, there is no anisotropy of the refraction ratio so that the prism pattern may not be formed.

Therefore, it is required to further include a phase retarding plate 30c for retarding the light in 90 degree between the first light path deflecting cell 30a and the second light path deflecting cell 30b. The horizontally polarized light passing the first light path deflecting cell 30a would be vertically polarized light, after passing through the phase retardation plate 30c.

Figure 6:
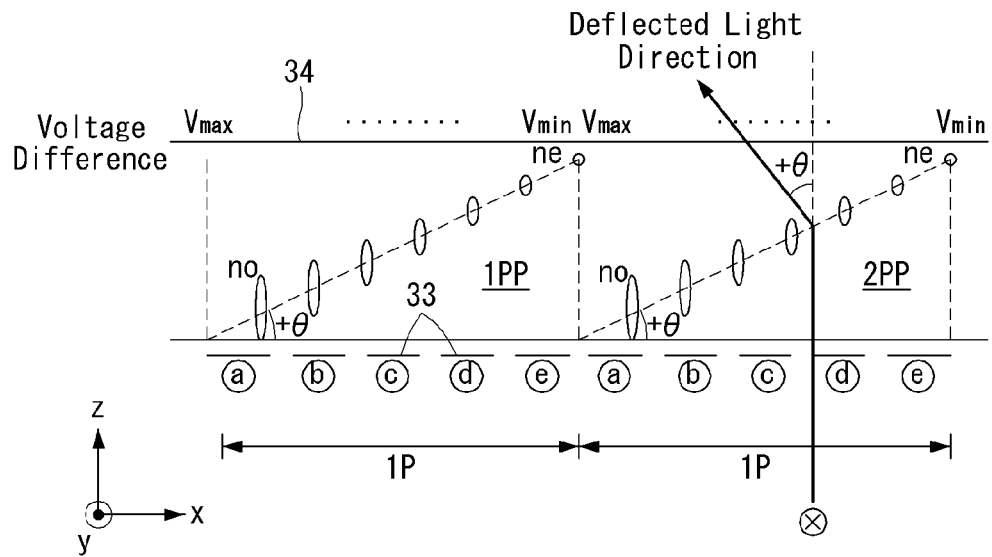
FIG. 6 is a cross sectional view illustrating a prism pattern of a second light path deflecting cell refracting the light to +θ direction.
Figure 7:
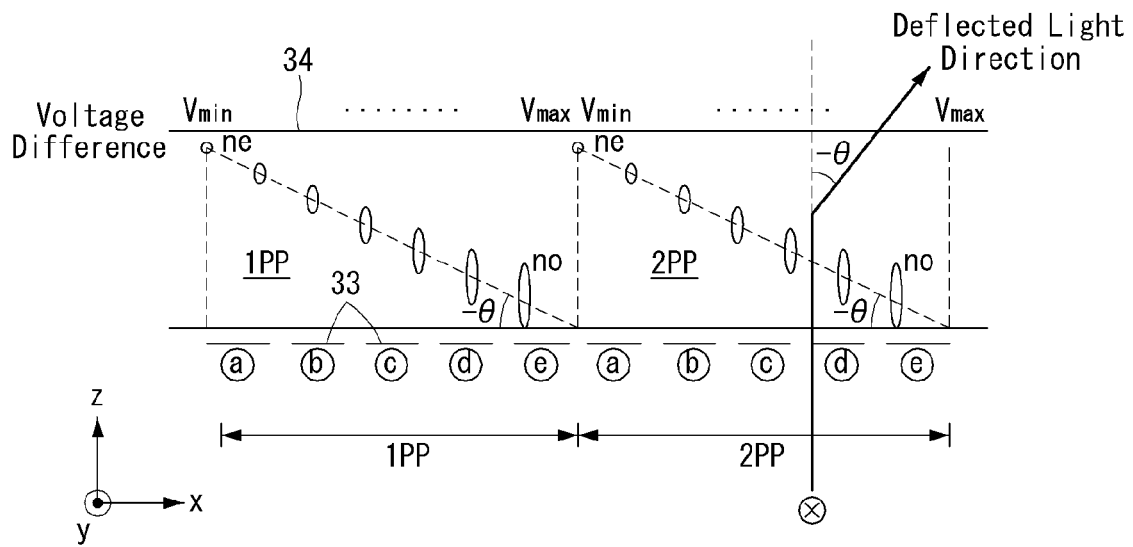
FIG. 7 is a cross sectional view illustrating a prism pattern of a second light path deflecting cell refracting the light to −θ direction.

Now, we will explain how the light would be refracted to left/right side by the second light path deflecting cell 30b, referring to FIGS. 6 and 7. FIGS. 6 and 7 are figures for explaining an example of the prism pattern formed in the second light path deflecting cell 30b. FIG. 6 is a cross sectional view illustrating a prism pattern of a second light path deflecting cell refracting the light to +θ direction. FIG. 7 is a cross sectional view illustrating a prism pattern of a second light path deflecting cell refracting the light to −θ direction.

As shown in figures, in the ECB mode, the prism pattern 1PP and 2PP can be represented by controlling the alignment direction of the liquid crystal molecules. In the ECB mode, the liquid crystal molecules can have any direction angle between the horizontal state (parallel to the Y axis of the FIGS. 6 and 7) to the first electrode 33 and the vertical state (parallel to the Z axis of the FIGS. 6 and 7) to the first electrode 33. In the ECB mode, when the liquid crystal molecules are aligned in the vertical direction to the first electrode 33 (parallel to the Z axis), the refraction ratio, no, is the minimum value. When the liquid crystal molecules are aligned in the horizontal direction to the first electrode 33 (parallel to the Y axis), the refraction ratio, ne, is the maximum value. As the light from the hologram display panel 10 is vertically polarized (parallel to the Y axis), the refraction ratio of this polarized light may be changed according to the alignment direction of the liquid crystal molecules of the second light path deflecting cell 30b. When the vertically polarized (parallel to the Y axis) light is passing through the horizontally aligned (parallel to the Z axis) liquid crystal molecules, the refraction ratio may be the minimum value, no. When the vertically polarized light is passing through the vertically aligned (parallel to the Y axis) liquid crystal molecules, the refraction ratio may be the maximum value, ne.

By controlling the aligned directions of the liquid crystal molecules included in one pitch 1P of the prism pattern 1PP and 2PP as to be progressively changed from vertical state (parallel to the Z axis) to the horizontal state (parallel to the Y axis) along the +X axis (from left side to right side), it is possible to make a prism pattern having the inclined angle of +θ, as shown in FIG. 6. By controlling the aligned direction of the liquid crystal molecules along the −X axis (from right side to left side), it is possible to make a prism pattern having the inclined angle of −θ, as shown in FIG. 7.

At first, in the case the prism pattern has the inclined angle of +θ, as shown in FIG. 6, the first electrodes 33 are supplied with the fifth driving voltage including the gradually decreased voltages along the +X axis. To the second electrode 34, a ground or reference voltage may be supplied. For example in FIG. 6, five of first electrodes 33 are disposed within the one pitch 1P of the first prism pattern 1PP; along the +X axis, ⓐ electrode, ⓑ electrode, ⓒ electrode, ⓓ electrode and ⓔ electrode are disposed. The V1 voltage is supplied to the ⓐ electrode, the V2 voltage is supplied to the ⓑ electrode, the V3 voltage is supplied to the ⓒ electrode, the V4 voltage is supplied to the ⓓ electrode and the V5 voltage is supplied to the ⓔ electrode. Here, these five voltages should be gradually decreased that is, the relations between them would be V1>V2>V3>V4>V5.

Further, in the case the prism pattern has the inclined angle of −θ, as shown in FIG. 7, the first electrodes 33 are supplied with the sixth driving voltage including the gradually increased voltages along the +X axis. To the second electrode 34, a ground or reference voltage may be supplied. For example, five of the first electrodes 33 are disposed within the one pitch 1P of the first prism pattern 1PP; along the −Y axis, as mentioned above. Here, these five voltages configuring the sixth driving voltage should be gradually increased, that is, the relations between them would be V1<V2<V3<V4<V5.

In the ECB mode, when no electric field is supplied to the liquid crystal cell, all liquid crystal molecules are aligned in the vertical direction (along the Y axis) parallel to the first electrode 33 running direction, that is, in the initial alignment direction. As all liquid crystal molecules in the liquid crystal cell LC are aligned in the vertical direction, the refraction ratios of the liquid crystal cells have the same value, ne. Therefore, the vertically polarized light from the hologram display panel 10 would transmit the second light path deflecting cell 30b without any refraction.

Referring to FIG. 2 again, we will explain about the driving method of the holography 3D display according to the first embodiment. The display panel 10 receives the hologram video data from the display panel driver 50 and then provides the hologram image to the observer.

Further, the detecting camera 90 takes the images of the observer and sends them to the controller 80. The controller 80 analyzes the observer's image to calculate the position value (or coordination) of the observer. Here, the position value includes the X-axis coordination value relating to the left/right direction of the observer and the Y-axis coordination value relating to the up/down direction of the observer. Comparing the detected and calculated position value of the observer with the reference position value, the controller 80 decides the relative positions (up/down and/or left/right) of the observer from the reference position.

According to the decision, the controller 80 selects any one of the first driving voltage to the third driving voltage and any one of the fourth driving voltage to the sixth driving voltage. Here, as the first to the third driving voltages are related to the Y axis coordination value of the observer, they are supplied to the first light path deflecting cell 30a to form the prism pattern. Further, as the fourth to the sixth driving voltages are related to the X axis coordination value of the observer, they are supplied to the second light path deflecting cell 30b to form the prism pattern.

When the newly detected and calculated position of the observer may be less than a predetermined threshold value, it means the observer locates at the reference position. The first light path deflecting cell 30a may select the first driving voltage, and the second light path deflecting cell 30b may select the fourth driving voltage. That is, the first and the second light path deflecting cells 30a and 30b may be controlled not to form any prism pattern.

Due to the diffraction phenomenon of the light, when the light is passing through the light deflection cells, the light may be divided into discrete orders. When the hologram image is displayed by dividing into the left eye image and the right eye image by frame, the discrete ordered lights may be supplied to the same eye. This causes the 3D cross-talk problem. For example, the hologram display panel 10 may represent the left eye image at the first frame and it may represent the right eye image at the second frame. At the second frame, due to the diffraction phenomenon, the left eye image of the first frame may be presented with the right eye image at the same time.

Hereinafter, referring to FIG. 8, we will explain how the 3D cross-talk can be caused in the light path deflecting cells according to the first embodiment of the present disclosure.

Figure 8:
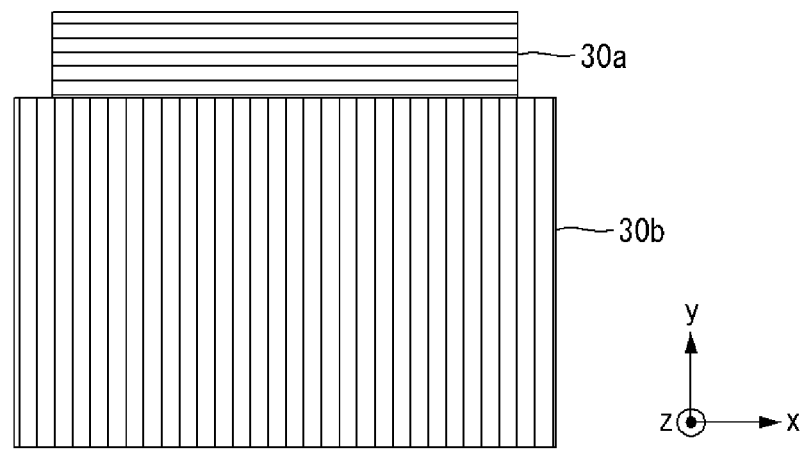
FIG. 8 is a drawing explaining the mechanism for generating the 3D cross-talk in the holography 3D display according to the first embodiment of the present disclosure.
Figure 8:
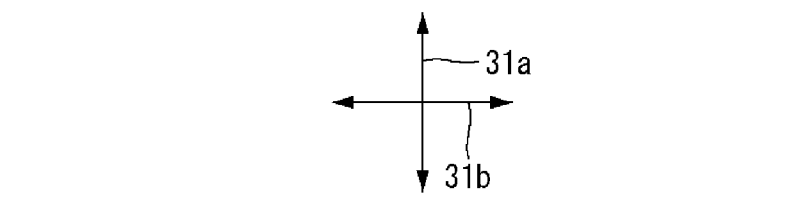
Figure 8:
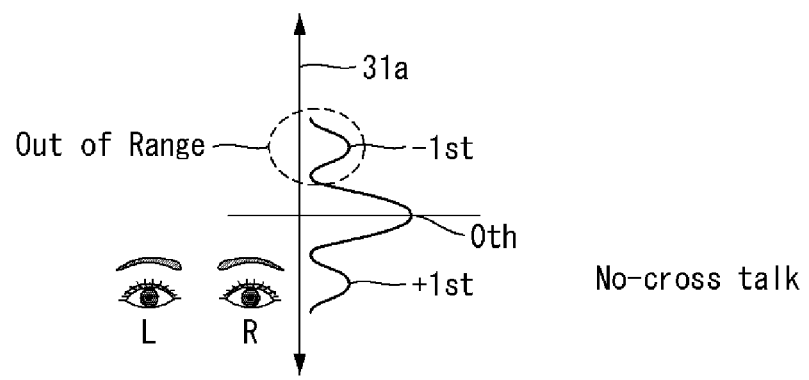
Figure 8:
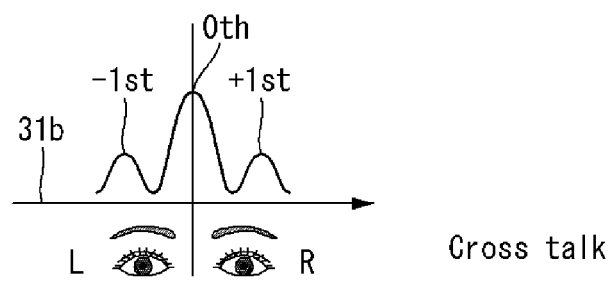

FIG. 8 is a drawing explaining the mechanism for generating the 3D cross-talk in the holography 3D display according to the first embodiment of the present disclosure.

The light from the hologram display panel 10 for displaying the holography 3D image may have the target position on the Y axis 31a (up/down direction) according to the first light path deflecting cell 30a in which the prism pattern is disposed in horizontal direction. Also, it may have the target position on the X axis 31b (left/right direction) according to the second light path deflecting cell 30b in which the prism pattern is disposed in vertical direction. As mentioned above, the light passing through the first light path deflecting cell 30a is diffracted, so that it is divided into various discrete orders. In detail, the first electrode formed in the first light path deflecting cell 30a is horizontally long shape, so that the first electrode works as a slit. As a result, the discrete lights by the diffraction are formed along the Y axis 31a.

Among the diffracted lights, the $0^{th}$ diffracted light includes the background noise, because the $0^{th}$ diffracted light means it is not diffracted. Therefore, the $0^{th}$ diffracted light may not be used. The $1^{st}$ diffracted light which may have image information at most is mainly used for displaying the holography image. So, the $1^{st}$ diffracted light should be radiated to the proper eye of the observer. For example, when the hologram display panel 10 suggests the right eye image, the first light path deflecting cell 30a may form the prism pattern as the $+1^{st}$ diffracted light is radiated to the Y axis coordination value where the right eye R of the observer is positioned. In that case, the $-1^{st}$ diffracted light which may have the same right image as the $+1^{st}$ diffracted light can be radiated far from the left eye of the observer, that is, out of range. So, the first light path deflecting cell 30a may contribute to cause the 3D cross talk problem.

However, after the light is passing through the second light path deflecting cell 30b, the situation is totally different. As the first electrode of the second light path deflecting cell 30b has the vertically long shape, so that the first electrode works as a slit. As a result, the discrete lights by the diffraction are formed along the X axis 31b. As mentioned above, when the hologram display panel 10 suggests the right eye image, the second light path deflecting cell 30b may form the prism pattern as the $+1^{st}$ diffracted light is radiated to the X axis coordination value where the right eye R of the observer is positioned. In that case, the $-1^{st}$ diffracted light which may have the same right image as the $+1^{st}$ diffracted light may be radiated to the left eye of the observer. So, the second light path deflecting cell 30b may cause the 3D cross talk problem.

In the first embodiment, in order to prevent the 3D cross talk problem, the observer's position should have enough distance from the hologram display panel 10 not to cause the 3D cross-talk. The enough distance may be satisfying the condition in which the $-1^{st}$ diffracted light may not be targeted to the left eye when the $+1^{st}$ diffracted light is targeted to the right eye.

Figure 9:
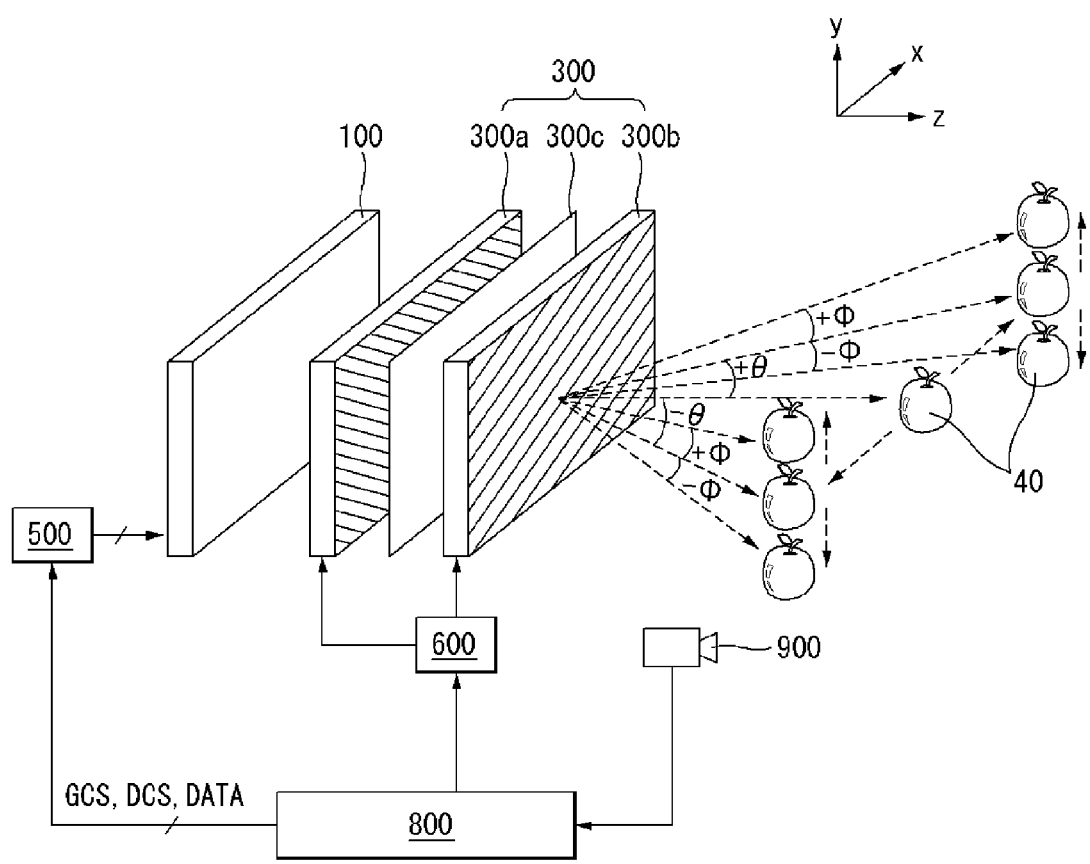
FIG. 9 is a perspective view illustrating a structure of a holography 3D display according to a second embodiment of the present disclosure.

Hereinafter, we suggest the second embodiment of the present disclosure in which the 3D cross-talk is not caused regardless of the observer's distance from the hologram display panel. FIG. 9 is a perspective view illustrating a structure of a holography 3D display according to a second embodiment of the present disclosure.

Referring to FIG. 9, a hologram 3D display according to the second embodiment of the present disclosure comprises a hologram display panel 100, a light deflecting cell 300 (or 'deflector') including a first and a second light path deflecting cells 300a and 300b and a phase retarding plate 300c located between them, a display panel driver 500, a deflector driver 600, a controller 800 and a detecting camera 900. The most elements are similar with those of the first embodiment. Differences are the configuration of the first and the second light path deflecting cells 300a and 300b and the driving method of them.

In the second embodiment, the hologram display panel 100 may have the similar structure as shown in FIG. 1. For example, the hologram display panel 100 may be made of the transmittive liquid crystal display panel. The hologram display panel 100 may display the interference fringe patterns by receiving the data relating to the interference fringe patterns from a computer or video processor (not shown in figures). Then, as the collimated light from the laser source disposed at one side of the hologram display panel 100 is radiated to the hologram display panel 100, the hologram images 40 may be displayed at the other side from the hologram display panel 10.

On the path of the collimated light is going (+Z axis of FIG. 9), the first light path deflecting cell 300a may be disposed next to the hologram display panel 100. The first light path deflecting cell 300a can transmit the light from the hologram display panel 100 as is. Or, it can refract the light to the right-up side or left-down side by forming a prism pattern disposed along the first axis direction (rotated with certain degree to clockwise direction from the X axis). Therefore, the hologram images 40 reproduced at distance apart from the hologram display panel 100 may be displayed at the right-up side/left-down side shifted position on the first axis by the first light path deflecting cell 300a.

Next to the first light path deflecting cell 300a, the second light path deflecting cell 300b may be further disposed. The second light path deflecting cell 300b can transmit the light from the first light path deflecting cell 300a as is. Or, it can refract the light to the left-up side or to the right-down side by forming a prism pattern disposed along the second axis direction (rotated with certain degree to clockwise direction from the Y axis) perpendicular to the first axis direction. Therefore, the hologram images 40 may be displayed at the left-up side/right-down side shifted position on the second axis perpendicular to the first second axis, by the second light path deflecting cell 300b.

The hologram display panel driver 500 includes a gate driver and a data driver. The data driver receives the hologram data DATA from the controller 800 and then converts the hologram data DATA to the positive/negative analogue data voltages using the positive/negative gamma compensation voltage supplied from the gamma voltage generator (not shown). The data driver supplies the positive/negative analogue data voltages to the data lines of the hologram display panel 100. The gate driver supplies the gate pulse (or 'scan pulse') synchronized with the data voltage to the gate lines of the hologram display panel 100 sequentially, by the controlling signal from the controller 800.

The deflector driver 600 supplies the driving voltages for controlling the deflector 300 to the first light path deflecting cell 300a and the second light path deflecting cell 300b, respectively. The driving voltages can decide the amount of inclination of the prism pattern formed at the deflector 300 so that the hologram images 40 can be radiated to a proper position of the user/observer. The driving voltages may be groups of voltages which are linearly increased or decreased for linearly controlling the alignment of the liquid crystal molecules disposed in the liquid crystal cell.

The deflector driver 600 may include a look-up table restoring a first driving voltage for passing the light supplied to the first light deflecting cell 300a as is, a second driving voltage for refracting the light to right-up side, and a third driving voltage for refracting the light to left-down side. Further, the look-up table may restore a fourth driving voltage for passing the light supplied to the second light deflecting cell 300b as is, a fifth driving voltage for refracting the light to left-up side, and a sixth driving voltage for refracting the light to right-down side. In this case, responding to the control signal from the controller 800, the deflector driver 600 selectively outputs voltages among the first to the sixth voltages according to the look-up table. Here, the look-up table can restore a plurality of driving voltages which decides the inclined angles of the prism patterns corresponding to the various positions of the observer.

The controller 800 may control the hologram display panel driver 500 for driving the hologram display panel 100. The controller 800 supplies the gate control signal GCS to the gate driver and it supplies the data control signal DCS and the hologram data DATA to the data driver. The gate control signal GCS may include a gate start pulse, a gate shift clock, a gate output enable and so on. The data control signal DCS may include a source start pulse, a source sampling clock, a source output enable, a polarity signal and so on.

The detecting camera 900 takes the pictures of the observer and sends them to the controller 800. The controller 800 analyzes the images of the pictures and calculates the position of the observer. The controller 800 compares the detected position of the observer with the reference position to decide the relative position of the observer from the reference position to the left side/right side and the upside/downside. According to this relative position of the observer, the controller 800 controls the deflector driver 600 and supplies the driving voltages for forming the prism pattern having proper inclined angle, to the first light path deflecting cell 300a and the second light path deflecting cell 300b, respectively.

Hereinafter, we will explain the light path deflecting cell 300. The first light path deflecting cell 300a forms the prism patterns which are parallel to the first axis direction (rotated with certain angle from the X axis). The diagonal axis direction from the left-up side to the right-down side on the first light path deflecting cell 300a in FIG. 9 is the align direction of the prism patterns. On the contrary, the second light path deflecting cell 300b forms the prism patterns which are parallel to the second axis direction (rotated with certain angle from the Y axis). The diagonal axis direction from the right-up side to the left-down side on the second light path deflecting cell 300b in FIG. 9 is the align direction of the prism patterns. Here, the second axis direction is perpendicular to the first axis direction.

The first axis direction may be rotated to the clockwise direction from the X axis. Otherwise, it may be rotated to the count-clockwise direction from the X axis. Here, in convenience, we explain with the case in which the first axis direction is rotated to the clockwise direction from the X axis. Further, the rotating angle is one value selected between 0 degree and 90 degrees. Preferably, the rotating angle would be within a range of 10 degrees and 80 degrees. The rotating angle would be selected as the −1st diffraction light of the right image is out of range from the left eye of the observer, when the +1st diffraction light of the right image is targeted to the right eye of the observer. For example, the rotating angle may be set to 45 degrees.

Figure 10:
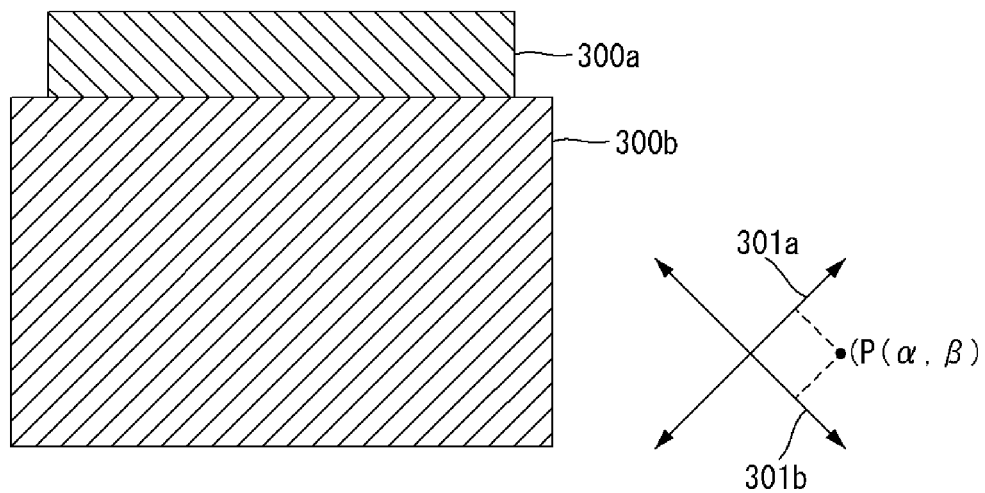
FIG. 10 is a drawing explaining the mechanism for solving the 3D cross-talk in the holography 3D display according to the second embodiment of the present disclosure.
Figure 10:
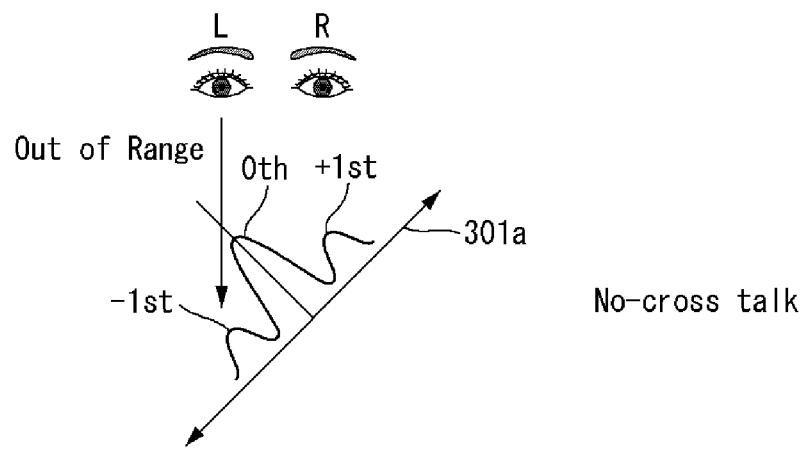
Figure 10:
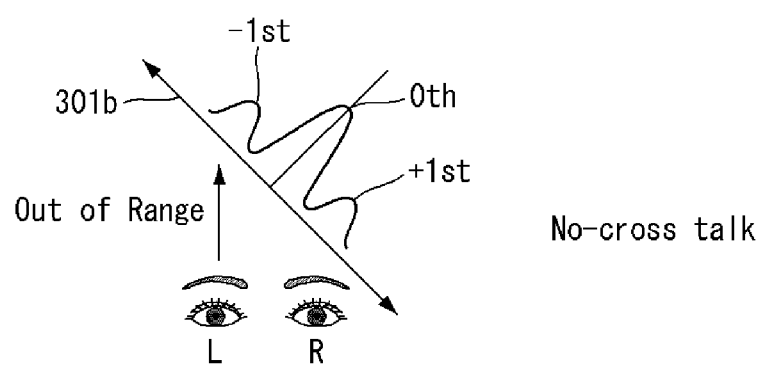

Further referring to FIG. 10, we will explain the mechanism for preventing the 3D cross-talk problem in the light path deflecting cells according to the second embodiment of the present disclosure, in detail. FIG. 10 is a drawing explaining the mechanism for solving the 3D cross-talk in the holography 3D display according to the second embodiment of the present disclosure.

By the first light path deflecting cell 300a having the prism pattern disposed along the first direction (from left-up to right-down), the light from the hologram display panel 100 for displaying the holography 3D image may have the target position on the first axis 301a of which axis direction is from right-up to left-down. In the interim, by the second light path deflecting cell 300b having the prism pattern disposed along the second direction (from right-up to left-down), the light representing the holography 3D image may have the target position on the second axis 301b of which axis direction is from left-up to right-down. As mentioned above, the light passing through the first light path deflecting cell 300a is diffracted so that it is divided into diffracted lights with various discrete orders. As a result, the diffracted lights by the diffraction are formed along the first axis 301a.

Among the diffracted lights, the $0^{th}$ diffracted light includes the background noise, because the $0^{th}$ diffracted light means it is not diffracted. Therefore, the $0^{th}$ diffracted light may not be used. The $1^{st}$ diffracted light which may have image information at most is mainly used for displaying the holography image. So, the $1^{st}$ diffracted light should be radiated to the proper eye of the observer. For example, when the hologram display panel 100 suggests the right eye image, the first light path deflecting cell 300a and the second light path deflecting cell 300b may form the prism patterns as the light is radiated to the right eye R of the observer. On the coordination system having the first axis 301a and the second axis 301b, the $+1^{st}$ diffraction light may be controlled to be radiated to the position $P(\alpha, \beta)$ of the right eye R of the observer.

In detail, the first light path deflecting cell 300a may control the $+1^{st}$ diffracted light of the right image as it is targeted to the β coordination value of the right eye of the observer on the first axis 301a. In that case, the $-1^{st}$ diffracted light of the right image which may have the same right image as the $+1^{st}$ diffracted light may be radiated far enough position (diagonally downward) from the left eye of the observer (out of range).

After that, the second light path deflecting cell 300b may control the $+1^{st}$ diffracted light of the right image as it is targeted to the α coordination value of the right eye of the observer on the second axis 301b. In that case, the $-1^{st}$ diffracted light of the right image which may have the same right image as the $+1^{st}$ diffracted light may be radiated far enough position (diagonally upward) from the left eye of the observer (out of range).

The line connecting the left eye and the right eye is along the X axis, but the line connecting the target position of the +1st diffracted light and the target position of the −1st diffracted light is along the first axis or the second axis. Therefore, it is possible that the 3D cross-talk problem is not occurred, regardless of the observer's distance from the hologram display panel 100. Consequently, the light path deflecting cells according to the second embodiment of the present disclosure has a structure preventing from the occurring the 3D cross-talk problem.

Figure 11:
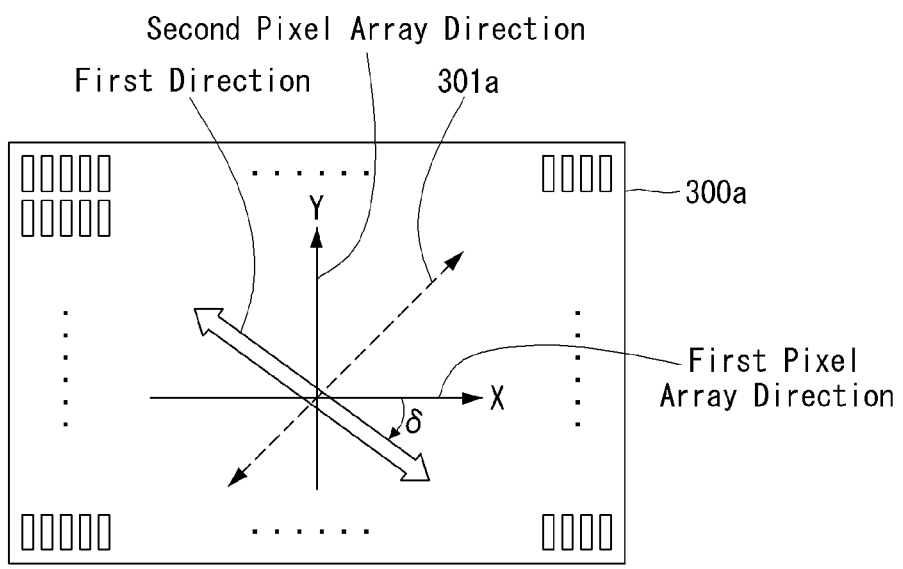
FIG. 11 is a schematic diagram illustrating the structure and the operating method of the first light path deflecting cell and the second light path deflecting cell according to a first example for representing the second embodiment of the present disclosure.
Figure 11:
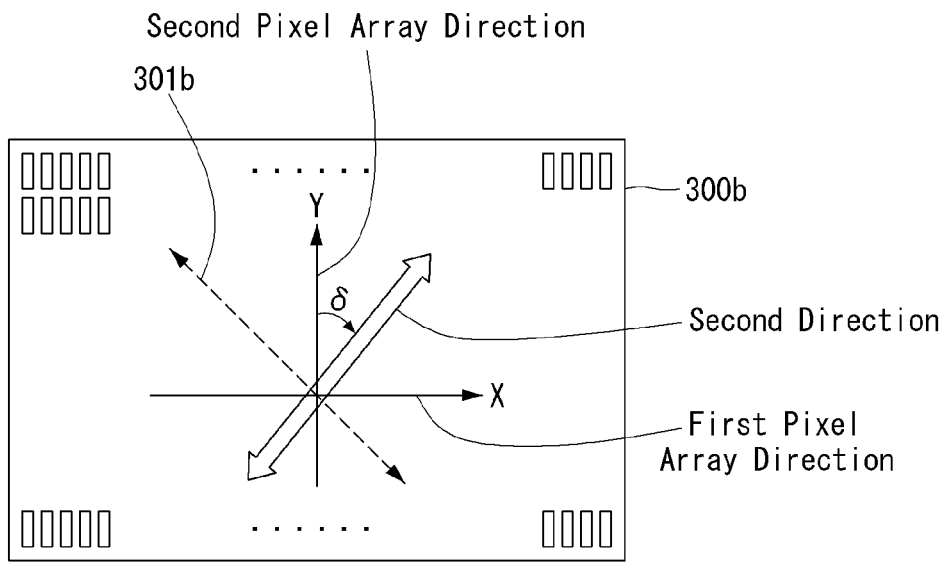
Figure 12:
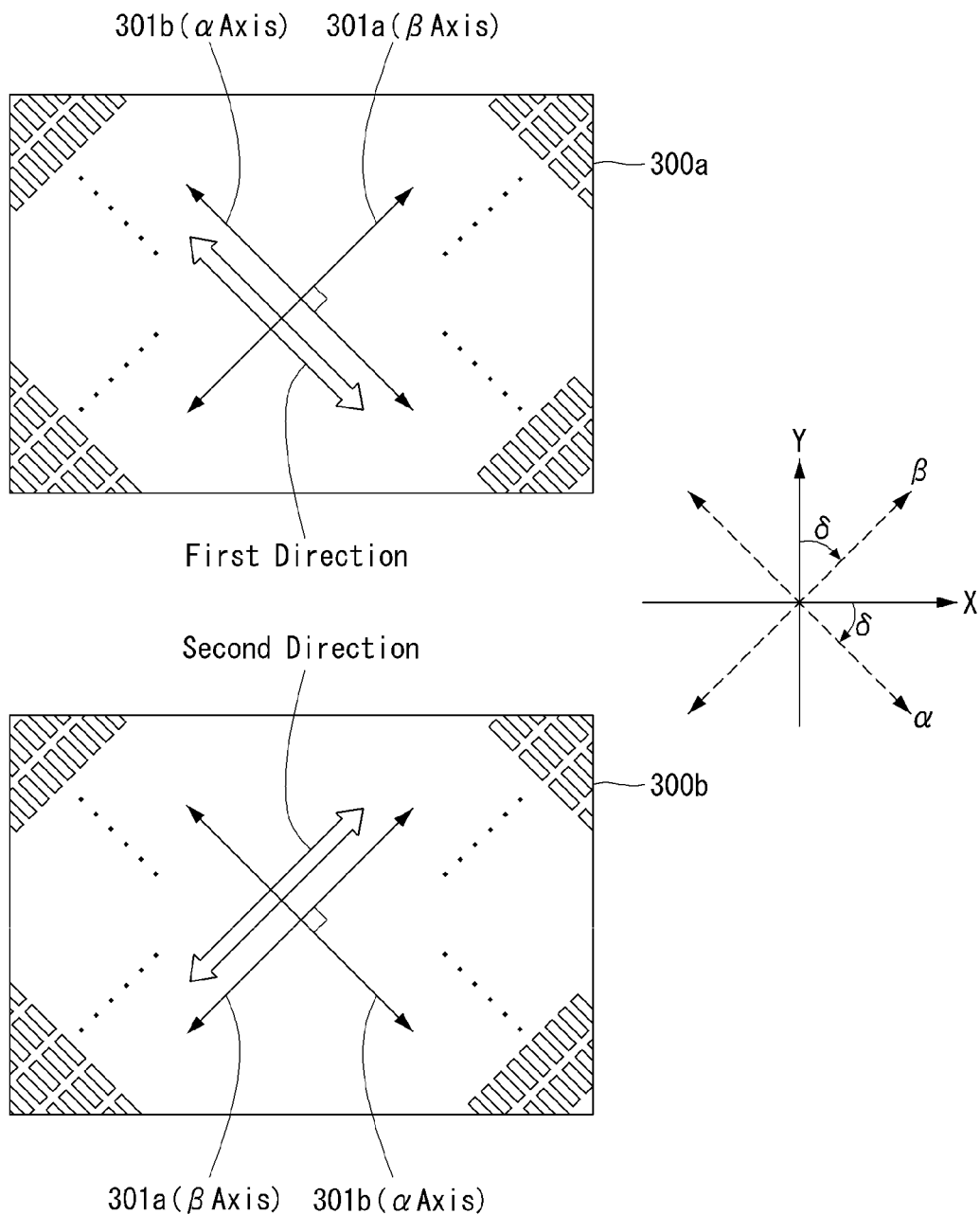
FIG. 12 is a schematic diagram illustrating the structure and the operating method of the first light path deflecting cell and the second light path deflecting cell according to a second example for representing the second embodiment of the present disclosure.

Hereinafter, referring to FIGS. 12 and 13, we will explain some exemplary embodiments of structure for driving the light path deflecting cells 300a and 300b according to the second embodiment in the plane coordination system rotating the X-Y coordination system with a predetermined angle. FIG. 11 is a schematic diagram illustrating the structure and the operating method of the first light path deflecting cell and the second light path deflecting cell according to a first example for representing the second embodiment of the present disclosure. FIG. 12 is a schematic diagram illustrating the structure and the operating method of the first light path deflecting cell and the second light path deflecting cell according to a second example for representing the second embodiment of the present disclosure.

At first, referring to FIG. 11, the first light path deflecting cell 300a and the second light path deflecting cell 300b may include liquid crystal displays in which a plurality of pixel cells are disposed in a matrix manner on the X-Y coordination system. For example, the first pixel array direction is along the X axis of the X-Y coordination system, and the second pixel array direction is along the Y axis of the X-Y coordination system.

For the case of the first light path deflecting cell 300a, the prism pattern is set on the first direction rotated with a predetermined angle, δ, to the clockwise direction from the X axis. The pixel cells having the same voltage level may be arrayed along the first direction to form the prism patterns. Then, the light inciding into the first light path deflecting cell 300a may be diffracted along the first axis 301a perpendicular to the first direction. By controlling the inclined angle of the prism patterns, the refraction angle along the first axis 301a can be adjusted, so that the target position of the light can be decided.

For the case of the second light path deflecting cell 300b, the prism pattern is set on the second direction rotating with a predetermined angle δ, in the clockwise direction from the Y axis. The pixel cells having the same voltage level may be arrayed along the second direction to form the prism patterns. Here, the second direction should be perpendicular to the first direction. Then, the light inciding into the second light path deflecting cell 300b may be diffracted along the second axis 301b perpendicular to the second direction. By controlling the inclined angle of the prism patterns, the refraction angle along the second axis 301b can be adjusted, so that the target position of the light can be decided.

Next, referring to FIG. 12, the first light path deflecting cell 300a and the second light path deflecting cell 300b may include liquid crystal displays in which a plurality of pixel cells is disposed in a matrix manner on the α-β coordination system which is the X-Y coordination system rotated by the predetermined angle δ in a clockwise direction. That is, the α axis is the X axis rotated in the clockwise direction by a predetermined angle δ, and the β axis is the Y axis rotated in the clockwise direction by the predetermined angle δ.

The prism pattern on the first light path deflecting cell 300a may be formed along the first direction parallel to the α axis 301b. In other words, the pixel cells having the same voltage level may be arrayed along the first direction (parallel to the α axis 301b) to form the prism patterns. Then, the light inciding into the first light path deflecting cell 300a may be diffracted on the β axis 301a. By controlling the inclined angle of the prism patterns, the refraction angle along the β axis 301a can be adjusted, so that the target position of the light can be decided.

The prism pattern on the second light path deflecting cell 300b may be formed along the second direction parallel to the β axis 301a. In other words, the pixel cells having the same voltage level may be arrayed along the first direction (parallel to the β axis 301a) to form the prism patterns. Then, the light inciding into the second light path deflecting cell 300b may be diffracted on the α axis 301b. By controlling the inclined angle of the prism patterns, the refraction angle along the α axis 301b can be adjusted, so that the target position of the light can be decided.

The liquid crystal panel used in the light path deflecting cells as shown in FIG. 11 is very familiar to the generally used liquid crystal display panel. By controlling or changing the method for driving the liquid crystal cell, the prism patterns having any wanted shapes can be formed. However, it is hard for the cell array having the same electrical field in the prism pattern to be formed in a perfectly linear shape. The reason is that the selected cell group should not have a linear shape but have a sawtooth shape when the cells are selected to form the prism pattern along the diagonal direction.

In the light path deflecting cells as shown in FIG. 12, the liquid crystal cells are arrayed in a matrix manner along the axis parallel to the direction of the prism pattern. The second example as shown in FIG. 12 has the merit to form the prism pattern in a linear shape than the first example as shown in FIG. 11. However, the array method and structure of the cells according to the second example is different from the generally used liquid crystal panel, so that is should be manufactured by a specific system.

Considering the characteristics and manufacturing conditions of the display panel, any one example between the first example and the second example may be selected. In any case, regardless of the observer's distance from the holography 3D display, the eyes of the observer is aligned along the X axis in most case. On the contrary, the +1st diffracted light and the −1st diffracted light is aligned along the diagonal axis (the first axis or the second axis). Therefore, the left image cannot be presented to the right eye of the observer or the right image cannot be presented to the left eye of the observer. The 3D cross talk problem can be structurally prevented.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for displaying a hologram image comprising:
    a display panel configured to display the hologram image;
    a back light unit disposed at one side of the display panel for supplying a back light;
    a first light path deflecting cell disposed at another side of the display panel facing away from the back light unit for forming a first prism pattern along a first direction rotated by a predetermined angle from a horizontal axis of the display panel; and
    a second light path deflecting cell disposed at one side of the first light path deflecting cell facing away from the display panel for forming a second prism pattern along a second direction perpendicular to the first direction.

2. The apparatus according to the claim 1, wherein the first light path deflecting cell refracts light from the display panel on a first axis perpendicular to the first direction, and
    the second light path deflecting cell refracts the refracted light from the first light path deflecting cell on a second axis perpendicular to the second direction.

3. The apparatus according to the claim 1, wherein the predetermined angle from the horizontal axis is within a range of 10 degrees to 80 degrees.

4. The apparatus according to the claim 3, wherein the predetermined angle is 45 degrees.

5. The apparatus according to the claim 1, wherein the first direction is rotated in any one of a clockwise direction and a counter-clockwise direction with the predetermined angle from the horizontal axis.

6. The apparatus according to the claim 1, further comprising:
a phase retarding plate disposed between the first light path deflecting cell and the second light path deflecting cell.

7. The apparatus according to the claim 6, wherein the phase retarding plate retards the phase of light from the first light path deflecting cell by 90 degrees.

8. The apparatus according to the claim 1, wherein the first light path deflecting cell includes a plurality of liquid crystal cells arrayed in a matrix manner along the horizontal axis and a vertical axis perpendicular to the horizontal axis, and
the plurality of the liquid crystal cells form the first prism pattern by having a first same electric voltage on the liquid crystal cells along the first direction.

9. The apparatus according to the claim 8, wherein the second light path deflecting cell includes another plurality of liquid crystal cells arrayed in the matrix manner along the horizontal axis and the vertical axis perpendicular to the horizontal axis, and
said another plurality of the liquid crystal cells form the second prism pattern by having a second same electric voltage on said another plurality of the liquid crystal cells along the second direction.

10. The apparatus according to the claim 1, wherein the first light path deflecting cell includes a plurality of liquid crystal cells arrayed in a matrix manner along the first direction and the second direction, and
the plurality of the liquid crystal cells form the first prism pattern by having a first same electric voltage on the plurality of liquid crystal cells along the first direction.

11. The apparatus according to the claim 10, wherein the second light path deflecting cell includes another plurality of liquid crystal cells arrayed in the matrix manner along the first direction and the second direction, and
said another plurality of the liquid crystal cells form the second prism pattern by having a second same electric voltage on said another plurality of liquid crystal cells along the second direction.

\* \* \* \* \*